C. E. PATRIC.
Mechanical Movement.

No. 212,621.  Patented Feb. 25, 1879.

Attest:
Clarence Poole
Aug. Jordan

Inventor:
Chas. E. Patric
By his Atty
R. D. O. Smith

UNITED STATES PATENT OFFICE

CHARLES E. PATRIC, OF ROCHESTER, NEW YORK.

IMPROVEMENT IN MECHANICAL MOVEMENTS.

Specification forming part of Letters Patent No. 212,621, dated February 25, 1879; application filed December 14, 1878.

*To all whom it may concern:*

Be it known that I, CHARLES E. PATRIC, of Rochester, in the county of Monroe and State of New York, have invented new and useful Improvements in Mechanical Movements, of which the following is a true and exact description.

This invention relates to mechanisms for the transmission of rotary motion with variable speed; and it principally consists in a gyrating disk or body with its periphery coupled by connecting-rods and clutch devices with a rotating shaft, whereby as said disk gyrates each point of its periphery alternately approaches and recedes from said shaft, and the connecting-rods are correspondingly reciprocated.

The employment of a proper number of connecting-rods and clutches will produce in the driven shaft a motion synchronous with the movement of the driving-shaft.

Variations in the diameter of the orbit of gyration will vary the length of reciprocation of the connection-rods, and correspondingly vary the speed of rotation of the driven shaft.

It also consists in special devices whereby, among other things, the gyrating movement is placed under control, so that the relative speed of the driving and the driven shafts may be varied at will.

That others may fully understand my invention, its construction, and mode of operation, I will more particularly describe it in connection with the accompanying drawings, wherein—

Figure 1:
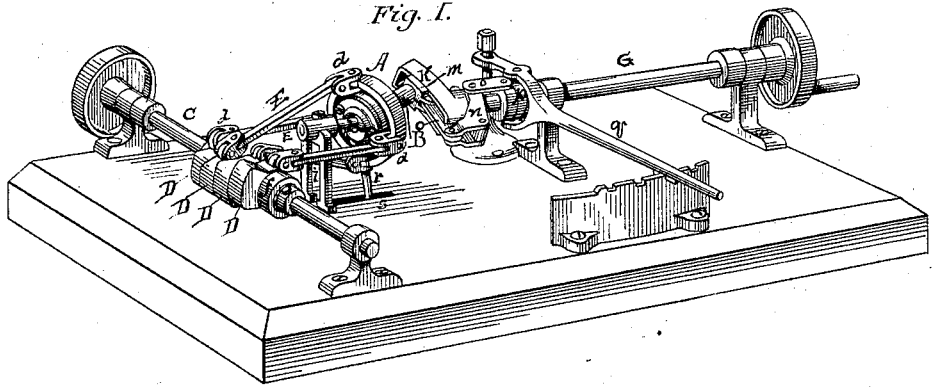
Figure 2:
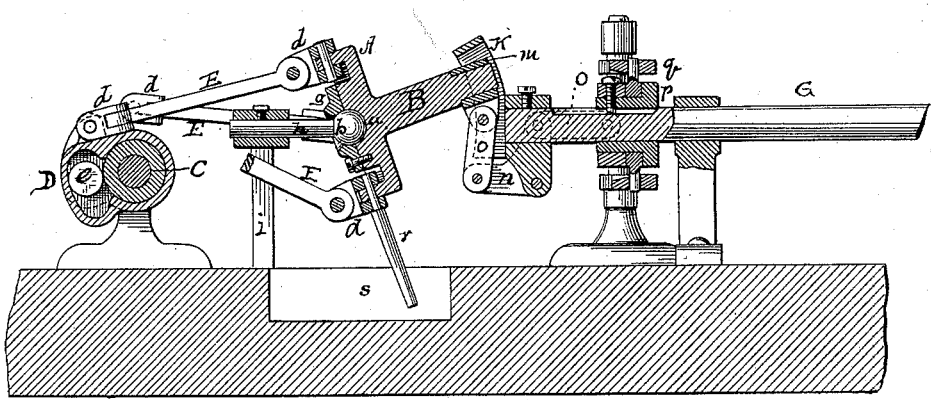
Figure 3:
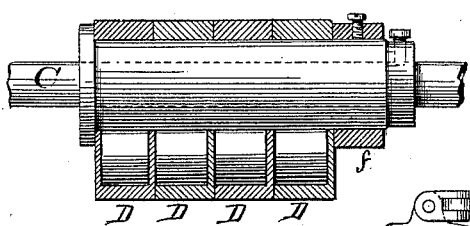
Figure 4:
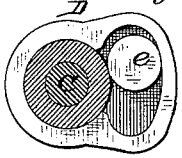
Figure 5:
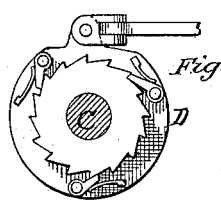

Figure 1 is a perspective view of my apparatus. Fig. 2 is a longitudinal section of the same; Figs. 3 and 4, longitudinal and transverse sections of the clutch. Fig. 5 represents a modification of the clutch.

For convenience, I will speak of the gyrating body as a disk, though it is manifest it may be constructed in various other forms.

A is the gyrating disk, mounted to rotate upon a fixed point at *a*, but provided with an axle or axial arm, B, which is attached to some suitable mechanism whereby its outer end may be carried around in a circular orbit. It is evident that as the arm B traverses its circular orbit each point upon the periphery of the disk will alternately approach and recede from the plane perpendicular to the axis of gyration, and that this reciprocation of the peripheral points does not involve any rotation of the disk A upon its own or any axis.

C is a shaft, to which rotary motion is to be imparted. It is placed in bearings transverse to the axis of gyration spoken of, and for convenience a little below or above the same. Upon said shaft C a number of clutch-devices, D, are placed. In Figs. 1, 2, 3, 4 these clutches are represented as frictional; but it is evident that positive gear-clutches may be substituted, and that for some purposes they will be preferable to friction-gear arrangements.

The clutches D engage with the shaft C when they are moved in one direction and cause said shaft to turn, but run free when moved in the opposite direction. If they are successively moved and their movements are so timed that one or another will be always in motion, then the rotation of the shaft C will also be continuous. To accomplish this continuous motion three or more of said clutches should be employed. The drawings represent four of them.

At equidistant points around the periphery of the disk A joint-pieces or clips *d* are pivoted, and connecting-rods E extend from said clips to similar clips jointed to the clutches D, respectively. Therefore, when the disk A is caused to gyrate the connecting-rods E are successively caused to reciprocate, and their joint effect is a continuous rotary motion of the shaft C.

This in brief describes the essential features of the invention. It is manifest they may be varied in the details without in any material particular departing from the gist of the invention. Therefore I do not propose to restrict myself to the forms or details shown in the drawings attached hereto, but to claim, broadly, a device for converting a gyratory motion into a continuous rotary motion by the interposition of a series of connecting-rods and clutches between said gyrating member and said rotating shaft.

I will now describe the particular construction which I prefer for the various parts of this device and some of those connected devices which are required to give the machine a useful operation.

The clutch D, as stated above, is represented as having frictional engagement with the shaft C. This is accomplished conveniently by means of a small cylindrical roller, $e$, placed upon the shaft within a cell in the clutch-block, said cell being of less depth at one end than at the other, so that as the clutch-block is moved in one direction said roller will retract to the deeper end of its cell, and as said block is moved in the opposite direction it will roll to the shallower end, and will there "wedge" and cause a frictional engagement between said shaft and clutch. As a matter of fact, the length of said cell is but little in excess of the diameter of said roller, so that the lost motion or distance traversed by the clutch in locking and unlocking is minute. This is an old and well-known clutch-connection, and I make no claim to its invention; but for some purposes a positive gearing, by means of ratchets and pawls, may be preferred. Such structure is shown in Fig. 5. The several clutch-blocks D are kept in position by a collar, $f$, which is fastened to the shaft, or by other means, as may be most convenient.

The connecting-rods E are provided with cross-axis joints at each end, so that they may be capable of motion in any direction, and thereby accommodate themselves to the irregular motion of the disk A. The disk A moves upon a bearing at $a$, and said bearing is preferably a sphere, $b$, seated in a correspondingly-shaped cell at the center of said disk. The cap which retains said spherical bearing in place is a collar, $g$, which is bolted to the face of the disk A. The sphere $b$ is mounted at the end of an arm, $h$, which is rigidly supported by a standard, $i$, a stud, $r$, projecting from the edge of the disk A. Its end, being confined in a slot, $s$, in the bed, prevents any rotary movement of the disk A.

A driving-shaft, G, is mounted in bearings, and its axis is coincident with the axis of the gyratory orbit of the disk A. The end of said shaft nearest the disk A is provided with a laterally-projecting crank, K, and the arm B may have its bearing at the end of said crank. This, however, will give but a single speed. To make the speed variable it is necessary to vary the obliquity of the arm B. I therefore curve crank K about the center of $b$ and make it serve as a guide for a block or head, $m$, which is fitted to slide in this guide; and it may be fixed at any desired point, or its position therein may be at all times under control of the attendant by means of the bell-crank $n$, which is joined by links $o$ to the collar $p$, which slides freely upon the shaft G, and is moved or arrested by the clutch-lever $q$.

The outer or free end of the arm B has its bearing in the block $m$, and is thereby caused to gyrate as the shaft G revolves, carrying said guide and head with it. The amplitude of this gyration will depend upon the distance of the block $m$ from its axis of rotation, and as this distance may be varied, as above indicated, the amplitude of gyration will be varied accordingly.

The speed of rotation of shaft C depends upon the amplitude of gyration of the disk A, and therefore while the speed of the driving-shaft G may remain constant the speed of the driven shaft C may be varied from the maximum possible to the structure of the particular mechanism down to a state of rest, because, when the head $m$ is adjusted over the end of the shaft G, so that the axis of B and G are coincident, there will be no gyration, and consequently no motion of the shaft C.

The driving-shaft G may be propelled by a belt, gearing, crank, or any convenient way of transmitting motion thereto from the prime mover.

This device is applicable to a great number of purposes where a variable speed is required. It may be employed on metal-working tools, lathes, drills, &c., on general machinery where step or cone pulleys are employed, or where "change-gears" are now required. It may be employed on agricultural machinery, such as grain-drills, &c. I therefore propose to use it in any connection wherein it is applicable.

What I claim as new, and desire to secure by Letters Patent, is—

1. A gyrating device combined with a rotating shaft and a series of clutches upon said shaft, and a corresponding series of interposed connecting-rods coupling said clutches with said gyrating member at a distance from its center of motion.

2. The disk or body A, moving upon bearings at $a$, and provided with an arm, B, whose movements around an axial line which cuts the center of the bearing $a$ cause said disk to gyrate, combined with the connecting-rods E, clutches D, and shaft C, substantially as set forth.

3. The gyrating disk A, provided with studs B and $r$, and the spherical bearing $b$, combined with the cross-axis joint-pieces $d$, connecting-rods E, clutches D, and shaft C.

4. The gyrating member A, provided with the stud B, rigidly attached thereto, and connected with the shaft C, substantially in the manner set forth, combined with a crank, K, at the end of a driving-shaft, G, whereby the rotation of said shaft G may be converted into a gyratory movement of said member A, as and for the purpose set forth.

5. The gyratory member A, provided with the stud B, combined with the crank K and bearing-head $m$ sliding therein, so that the stud B may be adjusted to greater or less amplitude of gyration, as desired.

6. The gyrating member A, provided with the stud B, crank K, and sliding head m, combined with the bell-crank n and sliding collar p, with the requisite connecting-links.

7. The gyrating member A, provided with the stud B, crank K, and operative clutch-lever q, whereby the relative speed of shaft C may be varied and controlled at will.

8. The gyrating member A, provided with the stud B, crank K, and sliding bearing-head m, combined with the bell-crank n and sliding collar p, with the requisite connecting-links, and the clutch-lever q, whereby the relative speed of shaft C may be varied at pleasure.

CHARLES E. PATRIC.

Witnesses:
W. H. GROOT,
L. M. HOYT.